United States Patent
Hong et al.

(10) Patent No.: US 12,436,764 B2
(45) Date of Patent: Oct. 7, 2025

(54) TIMING CONTROLLER AND DISPLAY DEVICE INCLUDING THE SAME

(71) Applicant: LG Display Co., Ltd., Seoul (KR)

(72) Inventors: Yumin Hong, Gyeonggi-do (KR); Sangyun Kim, Gyeonggi-do (KR); Seongen Lee, Gyeonggi-do (KR)

(73) Assignee: LG Display Co., Ltd (KR)

( * ) Notice: Subject to any disclaimer, the term of this patent is extended or adjusted under 35 U.S.C. 154(b) by 114 days.

(21) Appl. No.: 18/545,115

(22) Filed: Dec. 19, 2023

(65) Prior Publication Data
US 2024/0256279 A1    Aug. 1, 2024

(30) Foreign Application Priority Data
Jan. 31, 2023   (KR) .................. 10-2023-0013305

(51) Int. Cl.
G06F 9/30    (2018.01)
G06F 3/00    (2006.01)
G06F 3/14    (2006.01)
G06T 1/20    (2006.01)

(52) U.S. Cl.
CPC .......... *G06F 9/30145* (2013.01); *G06F 3/00* (2013.01); *G06F 3/14* (2013.01); *G06T 1/20* (2013.01)

(58) Field of Classification Search
CPC .......... G06F 9/30145; G06F 3/00; G06F 3/14; G06T 1/20
See application file for complete search history.

(56) References Cited

U.S. PATENT DOCUMENTS

| | | | |
|---|---|---|---|
| 6,795,076 B2 * | 9/2004 | Deering | G06T 15/005 345/506 |
| 8,074,056 B1 * | 12/2011 | Chen | G06F 9/3877 712/214 |
| 9,811,872 B2 * | 11/2017 | Noro | G06F 3/14 |
| 9,996,345 B2 * | 6/2018 | Veith | G06F 9/3887 |
| 11,397,583 B2 * | 7/2022 | Anderson | G06F 9/3853 |

* cited by examiner

*Primary Examiner* — Corey S Faherty
(74) *Attorney, Agent, or Firm* — Fish & Richardson P.C.

(57) ABSTRACT

A timing controller suitable for providing image data and control signals to a display panel includes at least one dedicated controller configured to instruct the display panel to perform a specific operation; and a dedicated processor configured to store at least one communication-dedicated instruction, interpret, according to a communication signal designating an operation area of a communication-dedicated instruction received from an external or internal general processor, the communication-dedicated instruction within the operation area, sequentially transmit communication request signals to the corresponding dedicated controller, sequentially receive communication completion signals from the dedicated controller, and transmit an operation completion signal to the general processor when a communication completion signal for the communication-dedicated instruction of the operation area is finally received.

12 Claims, 13 Drawing Sheets

FIG.9

| | 6 bits | 5 bits | 5 bits | 5 bits | 5 bits | 6 bits |
|---|---|---|---|---|---|---|
| R : | op | rs | rt | rd | shamt | funct |
| I : | op | rs | rt | address / immediate | | |
| J : | op | target address | | | | |

*FIG.10*

| 3bit | 5bit | 6bit | 2bit |
|---|---|---|---|
| Type | IP No. | OFFSET No. | X |

| 3bit | 13bit |
|---|---|
| Type | Constant |

TIMING CONTROLLER AND DISPLAY DEVICE INCLUDING THE SAME

CROSS-REFERENCE TO RELATED APPLICATION

This application claims the priority of Korean Patent Application No. 10-2023-0013305, filed on Jan. 31, 2023, which is hereby incorporated by reference in its entirety.

BACKGROUND

Field of the Disclosure

The present disclosure relates to a timing controller and a display device including the same.

Description of the Background

As the information society develops, demands for display devices for displaying an image are increasing in various forms. Various types of display devices such as a liquid crystal display device (LCD), a plasma display device and an organic light emitting display device (OLED) have been used.

A display device includes a display panel and a timing controller which outputs image data (RGB) inputted from the outside as image data (DATA) appropriate for the display panel and outputs various control signals on the basis of a timing signal inputted from the outside.

The timing controller includes a general processor which interprets an instruction of a memory built therein and generates calculation and communication control signals, and at least one dedicated module or dedicated unit which performs a specific operation or function according to a calculation result and the communication control signal of the general processor.

The general processor may use a polling scheme in which, after the communication control signal is transmitted to the dedicated module, the state of the dedicated module is checked by periodically/infinitely accessing the dedicated module, or an interrupt scheme in which an interrupt is received from the dedicated module, is determined and is performed.

Since the timing controller used in the display device is a time-critical application, completion of a communication operation is checked in the polling scheme.

The description provided in the background section should not be assumed to be prior art merely because it is mentioned in or associated with the background section. The background section may include information that describes one or more aspects of the subject technology.

SUMMARY

Since the polling scheme repeatedly checks the state of the dedicated module by periodically/infinitely accessing the dedicated module, the polling scheme may cause overload of the processor and a system bus. In the interrupt scheme, as an overall operating time increases due to the addition of a time for determining the interrupt, a delay in operating time may be caused.

Accordingly, the present disclosure is directed to a timing controller and a display device including the same that substantially obviate one or more of problems due to limitations and disadvantages described above.

More specifically, the present disclosure is to provide a timing controller which does not cause a delay in operating time while reducing overload of a processor and a system bus.

In addition, the present disclosure is to provide a timing controller and a display device including the same, which reduce overload of a processor and a system bus and do not cause a delay in operating time.

Additional features and advantages of the disclosure will be set forth in the description which follows and in part will be apparent from the description, or may be learned by practice of the disclosure. Other advantages of the present disclosure will be realized and attained by the structure particularly pointed out in the written description and claims hereof as well as the appended drawings.

To achieve these and other advantages and in accordance with the present disclosure, as embodied and broadly described, a timing controller includes at least one dedicated controller configured to instruct the display panel to perform a specific operation, and a dedicated processor. The dedicated processor may store at least one communication-dedicated instruction, interpret, according to a communication signal designating an operation area of a communication-dedicated instruction received from an external or internal general processor, the communication-dedicated instruction within the operation area, sequentially transmit communication request signals to the corresponding dedicated controller, sequentially receive communication completion signals from the dedicated controller, and transmit an operation completion signal to the general processor when a communication completion signal for the communication-dedicated instruction of the operation area is finally received.

[In another aspect of the present disclosure, a display device includes a display panel including two or more pixels which are disposed at intersections of data lines and gate lines; a driving driver configured to drive the data lines and the gate lines; and a timing controller configured to provide image data and control signals to the driving driver.

The timing controller and the display device including the same according to the aspects of the present disclosure may reduce overload of a processor and a system bus and may not cause a delay in operating time.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which may be included to provide a further understanding of the disclosure and may be incorporated in and constitute a part of the disclosure, illustrate aspects of the disclosure and together with the description serve to explain various principles of the disclosure.

In the drawings:

FIG. 9 is an example of a data structure diagram of a communication instruction, and FIG. 10 is an example of a data structure diagram of a communication-dedicated instruction;

DETAILED DESCRIPTION

Figure 1:
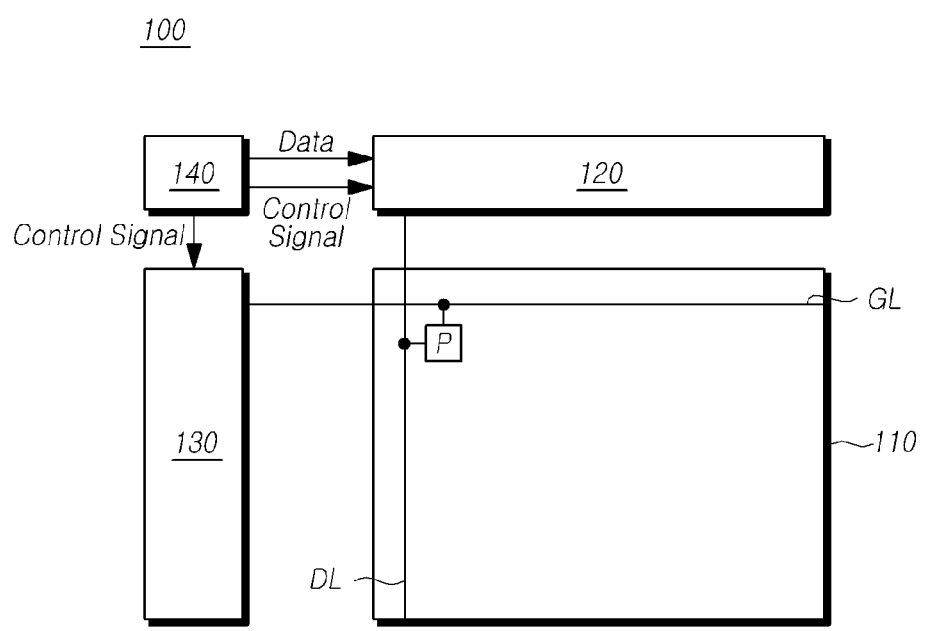
FIG. 1 is a schematic system configuration diagram of a display device in accordance with example aspects of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

In the following description of examples or aspects of the present disclosure, reference will be made to the accompanying drawings in which it is shown by way of illustration specific examples or aspects that may be implemented, and in which the same reference numerals and signs may be used to designate the same or like components even when they are shown in different accompanying drawings from one another. Further, in the following description of examples or aspects of the present disclosure, detailed descriptions of well-known functions and components incorporated herein will be omitted or may be briefly provided when it is determined that the description may make the subject matter in some aspects of the present disclosure rather unclear. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations may be selected only for convenience of writing the specification and may be thus different from those used in actual products. The terms such as "including," "having," "containing," "constituting" "make up of," and "formed of" used herein are generally intended to allow other components to be added unless the terms are used with the term "only." As used herein, singular forms are intended to include plural forms unless the context clearly indicates otherwise. Any implementation described herein as an "example" is not necessarily to be construed as preferred or advantageous over other implementations.

Advantages and features of the present disclosure, and implementation methods thereof will be clarified through following example aspects described with reference to the accompanying drawings. The present disclosure may, however, be embodied in different forms and should not be construed as limited to the example aspects set forth herein. Rather, these example aspects may be provided so that this disclosure may be sufficiently thorough and complete, to assist those skilled in the art to fully understand the scope of the present disclosure. Further, the present disclosure is only defined by scopes of claims.

The shapes, sizes, ratios, angles, numbers, and the like, which are illustrated in the drawings to describe various example aspects of the present disclosure are merely given by way of example. Therefore, the present disclosure is not limited to the illustrations in the drawings.

Terms, such as "first," "second," "A," "B," "(A)," or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only may the first element "be directly connected or coupled to" or "directly contact or overlap" the second element, but a third element may also be "interposed" between the first and second elements, or the first and second elements may "be connected or coupled to", "contact or overlap", etc. each other via a fourth element. Here, the second element may be included in at least one of two or more elements that "are connected or coupled to", "contact or overlap," etc. each other.

Where positional relationships are described, for example, where the positional relationship between two parts is described using "on," "over," "under," "above," "below," "beneath," "near," "close to," or "adjacent to," "beside," "next to," or the like, one or more other parts may be disposed between the two parts unless a more limiting term, such as "immediate(ly)," "direct(ly)," or "close(ly)" is used. For example, when a structure is described as being positioned "on," "over," "under," "above," "below," "beneath," "near," "close to," or "adjacent to," "beside," or "next to" another structure, this description should be construed as including a case in which the structures contact each other as well as a case in which a third structure is disposed or interposed therebetween. Furthermore, the terms "left," "right," "top," "bottom, "downward," "upward," "upper," "lower," and the like refer to an arbitrary frame of reference.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the more limiting term "just," "directly" or "immediately" is used together.

In addition, when any dimensions, relative sizes etc. are mentioned, it should be considered that numerical values for an elements or features, or corresponding information (e. g., level, range, etc.) include a tolerance or error range that may be caused by various factors (e. g., process factors, internal or external impact, noise, etc.) even when a relevant description is not specified. Further, the term "may" fully encompasses all the meanings of the term "may."

Unless otherwise defined, all terms (including technical and scientific terms) used herein have the same meaning as commonly understood by one of ordinary skill in the art to which example aspects belong. It will be further understood that terms, such as those defined in commonly used dictionaries, should be interpreted as having a meaning for example consistent with their meaning in the context of the relevant art and should not be interpreted in an idealized or overly formal sense unless expressly so defined herein. For example, the term "part" or "unit" may apply, for example, to a separate circuit or structure, an integrated circuit, a computational block of a circuit device, or any structure configured to perform a described function as should be understood to one of ordinary skill in the art.

Features of various aspects of the present disclosure may be partially or overall coupled to or combined with each other, and may be variously inter-operated with each other and driven technically as those skilled in the art may sufficiently understand. Aspects of the present disclosure may be carried out independently from each other, or may be carried out together in co-dependent relationship.

Unless otherwise defined, all terms (including technical and scientific terms) used herein have the same meaning as commonly understood by one of ordinary skill in the art to which example aspects belong. It will be further understood that terms, such as those defined in commonly used dictionaries, should be interpreted as having a meaning for example consistent with their meaning in the context of the relevant art and should not be interpreted in an idealized or overly formal sense unless expressly so defined herein. For example, the term "part" or "unit" may apply, for example, to a separate circuit or structure, an integrated circuit, a computational block of a circuit device, or any structure configured to perform a described function as should be understood to one of ordinary skill in the art.

Hereinafter, example aspects of the present disclosure will be described in detail with reference to the accompanying drawings.

FIG. 1 is a schematic system configuration diagram of a display device in accordance with example aspects of the present disclosure.

Referring to FIG. 1, a display device 100 in accordance with example aspects of the present disclosure may include a display panel 110 in which a plurality of pixels P are disposed, a source driver 120 which is connected to the display panel 110 and drives a plurality of data lines DL, a gate driver 130 which drives a plurality of gate lines GL, and a timing controller 140 which controls driving of the source driver 120 and the gate driver 130. In the present specification, the source driver 120 and the gate driver 130 are collectively referred to as a driving driver.

The plurality of data lines DL and the plurality of gate lines GL are disposed in the display panel 110, and the pixels P are disposed in a matrix type at intersections of the respective data lines DL and the respective gate lines GL.

The gate driver 130 sequentially supplies scan signals to the plurality of gate lines GL under the control of the timing controller 140 to sequentially drive the plurality of gate lines GL. The gate driver 130 is also referred to as a scan driver.

When a gate line GL is open by a specific scan signal, the source driver 120 converts image data Data received from the timing controller 140 into analog type data voltages (Vdata) and supplies the data voltages (Vdata) to the plurality of data lines DL to drive the plurality of data lines DL.

The timing controller 140 converts image data (RGB) inputted from the outside to suit a data signal format used in the source driver 120, and outputs the converted image data Data. Besides, to control the source driver 120 and the gate driver 130, the timing controller 140 receives timing signals such as a vertical synchronization signal (Vsync), a horizontal synchronization signal (Hsync), an input DE signal and a clock signal (BLCK), generates various control signals, and outputs the various control signals to the source driver 120 and the gate driver 130.

Figure 2:
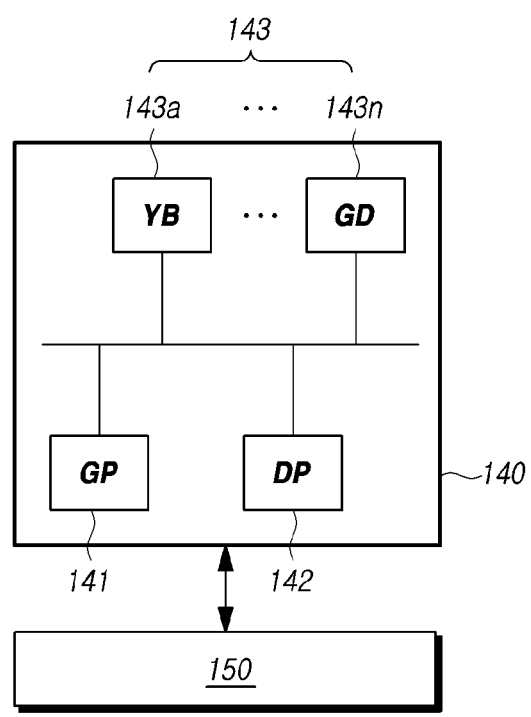
FIGS. 2 and 3 are examples of system configuration diagrams of a timing controller of FIG. 1.
Figure 3:
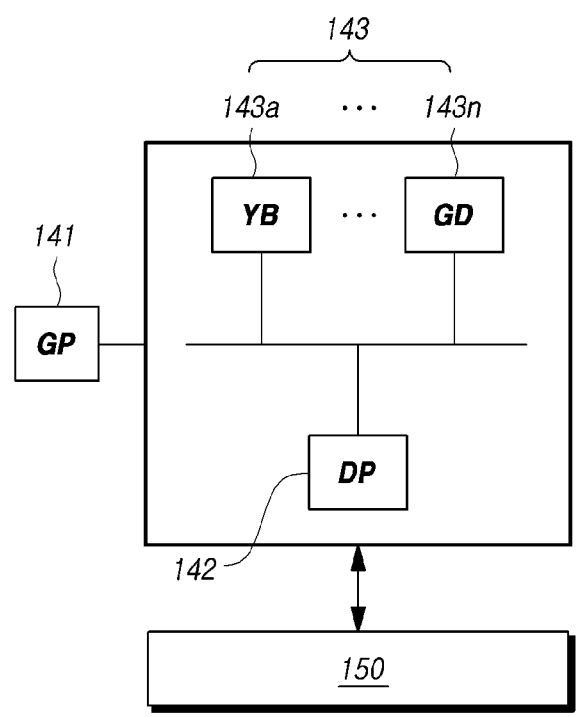

FIGS. 2 and 3 are examples of system configuration diagrams of a timing controller of FIG. 1.

Referring to FIGS. 2 and 3, the timing controller 140 is a timing controller which provides the image data Data and the control signals to the source driver 120 and the gate driver 130 being the driving driver of the display device 100.

The timing controller 140 includes at least one dedicated controller 143 which instructs the source driver 120 and the gate driver 130 being the driving driver to perform a specific operation, and a dedicated processor 142 which interprets a communication-dedicated instruction and transmits a communication control signal instructing performing of a specific operation to the dedicated controller 143.

The dedicated processor 142 stores at least one communication-dedicated instruction, interprets, according to a communication signal designating the operation area of a communication-dedicated instruction received from an external or internal general processor 141, the communication-dedicated instruction within the operation area, sequentially transmits communication request signals to the corresponding dedicated controller 143, and sequentially receives communication completion signals from the dedicated controller 143. The dedicated processor 142 transmits an operation completion signal to the general processor 141 when a communication completion signal for the communication-dedicated instruction of the operation area is finally received.

The general processor 141 may be built in the timing controller 140 as illustrated in FIG. 2, or may be disposed outside the timing controller 140 as illustrated in FIG. 3.

The dedicated controller 143 is one or more dedicated modules or dedicated units which perform a specific operation or function. For example, the dedicated controller 143 may be a screen compensation-dedicated controller 143a which performs a screen compensation function of the display panel 110 or another dedicated controller 143n which performs another function.

Figure 4:
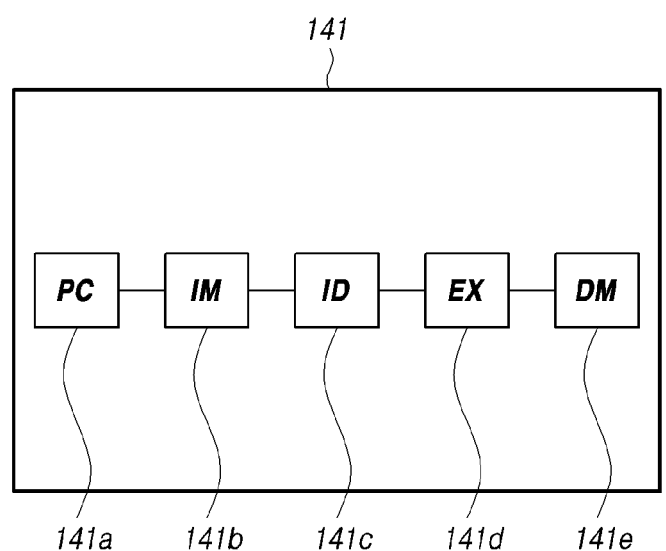
FIG. 4 is an example of a system configuration diagram of a general processor 141 shown in FIGS. 2 and 3.

FIG. 4 is an example of a system configuration diagram of the general processor 141 shown in FIG. 2 or 3.

Referring to FIG. 4, the general processor 141 includes a first program counter 141a, a first instruction memory 141b which stores instructions including communication instructions, a first instruction decoder 141c which interprets an instruction designated by the first program counter 141a, a first executer 141d which performs a calculation or generates a communication signal according to a result interpreted by the first instruction decoder 141c, and a first data memory 141e which stores a calculation result.

To make computer hardware perform a work, an expression should be made in a language that the hardware may understand. In a computer language, a word is called an instruction, and a set of instructions is called an instruction set. In the present specification, an instruction or an instruction set is exemplarily described as MIPS (Microprocessor without Interlocked Pipeline Stages), but may be various instructions or instruction sets other than MIPS, for example, Intel x86 or ARMVx-based instructions.

Instructions stored in the first instruction memory 141b include not only various instructions that cause a general processor to perform a work but also communication instructions that are used to start communication so that the dedicated processor 142 instructs the dedicated controller 143 to perform a specific operation. A communication instruction is also a type of instruction, and is named to emphasize or distinguish that the communication instruction is used to start communication so that the dedicated processor 142 instructs the dedicated controller 143 to perform a specific operation.

The system configuration of the general processor 141 described above has the same or substantially same system configuration as that of a general processor included in a conventional timing controller. However, since the timing controller 140 includes the dedicated processor 142, a communication instruction necessary to provide a communication signal designating the operation area of a communication-dedicated instruction to be stored in the dedicated processor 142 is stored.

In detail, when the first program counter 141a designates a communication instruction, the first instruction decoder 141c interprets the communication instruction, and the first executer 141d generates a communication signal which designates the operation area of a communication-dedicated instruction, according to the interpreted communication instruction.

After transmitting a communication signal to the dedicated processor 142, the general processor 141 designates a next instruction by increasing the value of the first program counter 141a, and performs another operation according to the next instruction.

As described above, the general processor 141 may play an auxiliary role such as transferring initial setting information of the dedicated controller 143 by transmitting a communication signal in a communication control process, and the dedicated processor 142 may perform a detailed communication control process as will be described below. Through this, since the general processor 141 is involved in only an initial communication stage, the use of the general processor 141 may be reduced, and the general processor 141 may continuously execute other algorithms.

Figure 5:
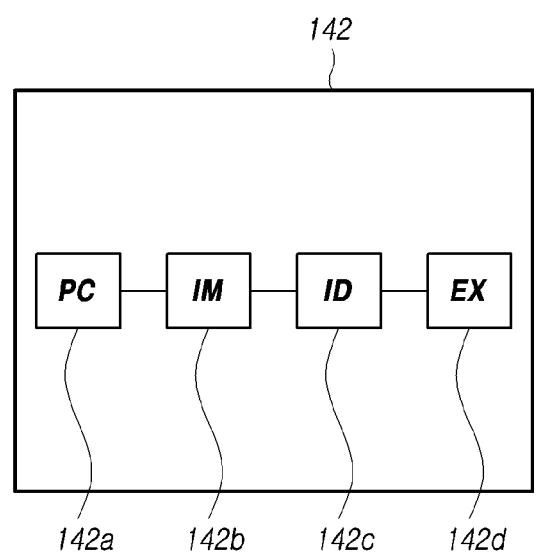
FIG. 5 is an example of a system configuration diagram of a dedicated processor of FIGS. 2 and 3.

FIG. 5 is an example of a system configuration diagram of a dedicated processor of FIG. 2 or 3.

Referring to FIG. 5, the dedicated processor 142 includes a second program counter 142a, a second instruction memory 142b which stores one or more communication-dedicated instructions, a second instruction decoder 142c which interprets a communication-dedicated instruction designated by the second program counter 142a, and a second executer 142d.

The second executer 142d may sequentially transmit communication request signals to the corresponding dedicated controller 143 by interpreting a communication-dedicated instruction within an operation area according to a result interpreted by the second instruction decoder 142c, may sequentially receive communication completion signals from the dedicated controller 143, and may transmit an operation completion signal to the general processor 141 when a communication completion signal for the communication-dedicated instruction of the operation area is finally received.

Unlike the general processor 141 described above, the dedicated processor 142 includes only components which are needed to store and interpret a communication-dedicated instruction necessary for communication with the dedicated controller 143. For example, the dedicated processor 142 may not include a data memory the same or substantially same as that included in the general processor 141.

Figure 6:
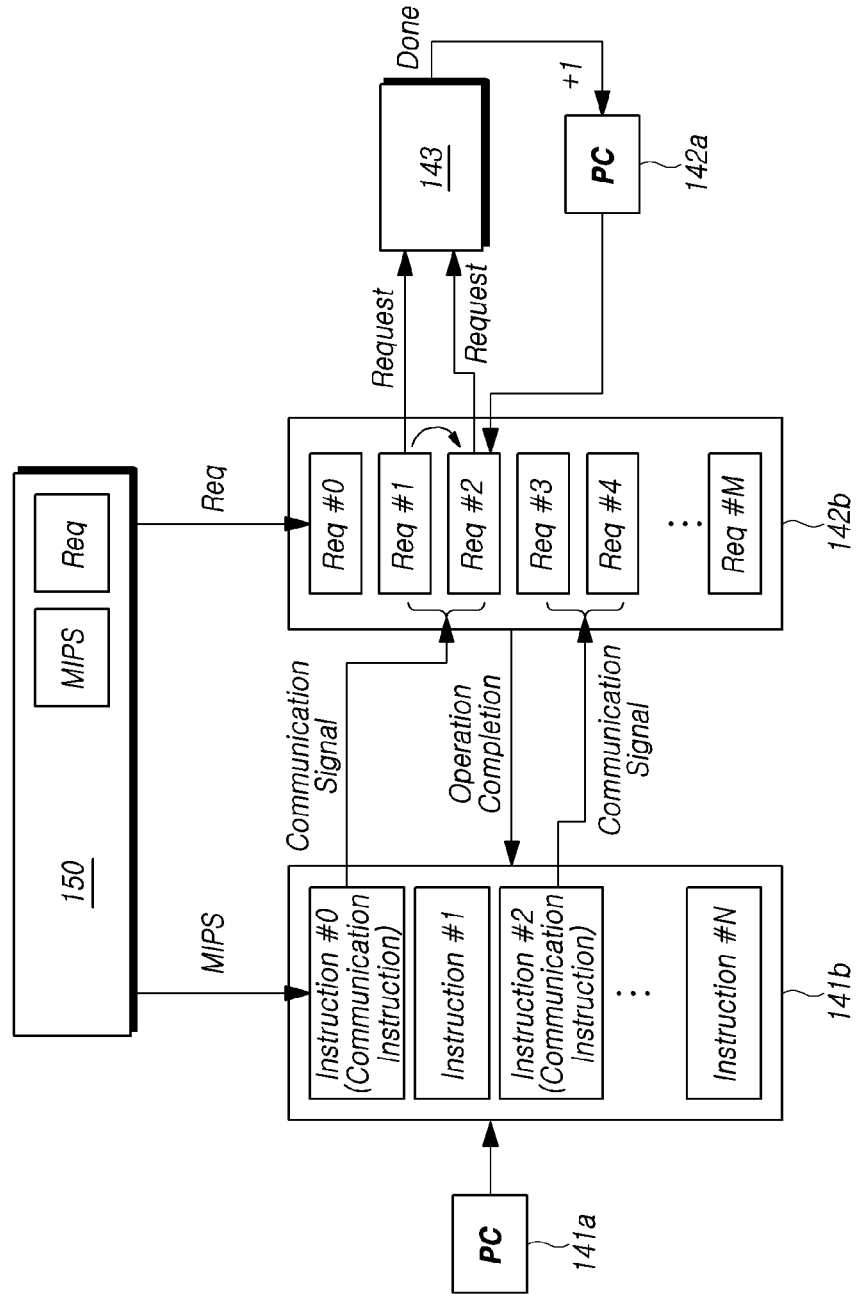
FIG. 6 is a diagram illustrating data paths of the timing controller of FIGS. 2 and 3.

FIG. 6 is a diagram illustrating data paths of the timing controller of FIG. 2 or 3.

Referring to FIG. 6, the general processor 141 fetches an instruction MIPS including a communication instruction from an external or internal nonvolatile memory 150, and stores the instruction MIPS in the first instruction memory 141b.

For example, it is assumed that the instruction MIPS stored in the first instruction memory 141b is n+1 number of instructions (an instruction #0 to an instruction #N), and among the n+1 number of instructions (the instruction #0 to the instruction #N), the first instruction #0 and the third instruction #2 are communication instructions and the other instructions are instructions for performing general calculations.

The dedicated processor 142 fetches a communication-dedicated instruction Req from the nonvolatile memory 150, and stores the communication-dedicated instruction Req in the second instruction memory 142b.

For example, it is assumed that the communication-dedicated instruction Req stored in the second instruction memory 142b is m+1 number of communication-dedicated instructions Req #0 to Req #M, an operation area designated by the first instruction #0 is second and third communication-dedicated instructions Req #1 and Req #2, and an operation area designated by the third instruction #2 is fourth and fifth communication-dedicated instructions Req #3 and Req #4.

Referring to FIGS. 4 to 6, when the first program counter 141a indicates the first instruction #0 stored in the first instruction memory 141b, since the first instruction #0 is a communication instruction, the first executer 141d finally transmits a first communication signal whose operation area designates operation areas of the second and third communication-dedicated instructions Req #1 and Req #2.

After transmitting a first operation signal, the general processor 141 may designate the next instruction #2 by increasing the program counter value of the first program counter 141a, and according to the instruction #2, the first executer 141d may continuously perform another calculation without interruption.

The dedicated processor 142 which receives the first communication signal interprets the second communication-dedicated instruction Req #1 of the second and third communication-dedicated instructions Req #1 and Req #2 of the operation area designated by the first communication signal, and transmits a communication request signal Request to the corresponding dedicated controller 143. The dedicated controller 143 transmits a control signal corresponding to the first communication request signal Request to the driving driver, and transmits a communication completion signal Done to the dedicated processor 142.

The second program counter 142a of the dedicated processor 142 designates the third communication-dedicated instruction Req #2 by increasing a program counter value. The dedicated processor 142 transmits a second communication request signal Request to the corresponding dedicated controller 143 by interpreting the third communication-dedicated instruction Req #2. The dedicated controller 143 transmits a control signal corresponding to the second communication request signal Request to the driving driver, and transmits a communication completion signal Done to the dedicated processor 142.

After performing operations corresponding to the second and third communication-dedicated instructions Req #1 and Req #2 of the operation area designated by the first communication signal, the dedicated processor 142 transmits an operation completion signal to the general processor 141. When the operation completion signal is received while performing other operations according to other instructions, the general processor 141 confirms that a corresponding operation has been completed. It is to be noted that, although example aspects of the present disclosure are described by a communication signal designating operation area of the communication-dedicated instruction, the present disclosure is not limited thereto. For example, the communication signal may designate an identifier of the communication-dedicated instruction and the like, as long as one or more communication-dedicated instruction may be selected by the communication signal.

When designating a next communication instruction while performing an operation according to another instruction, the general processor 141 performs the same or substantially same operation as described above.

Figure 7A:
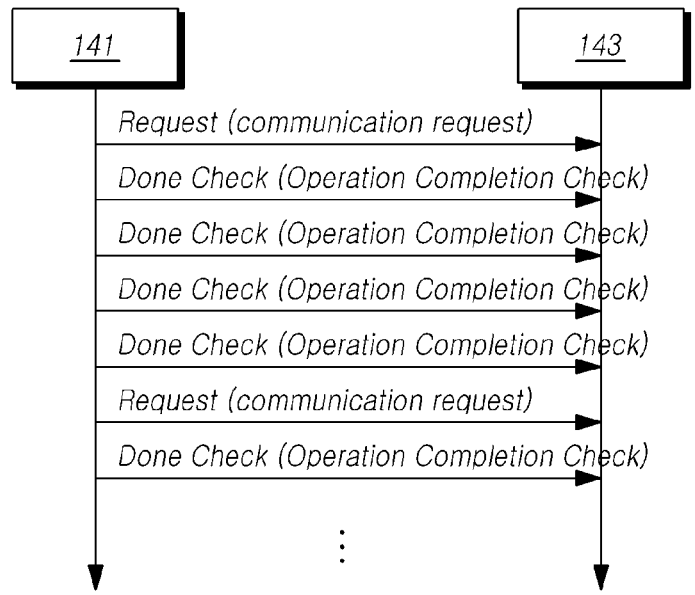
FIG. 7A is a diagram comparing and explaining a case where a general processor included in a conventional timing controller operates in a polling scheme.
Figure 7B:
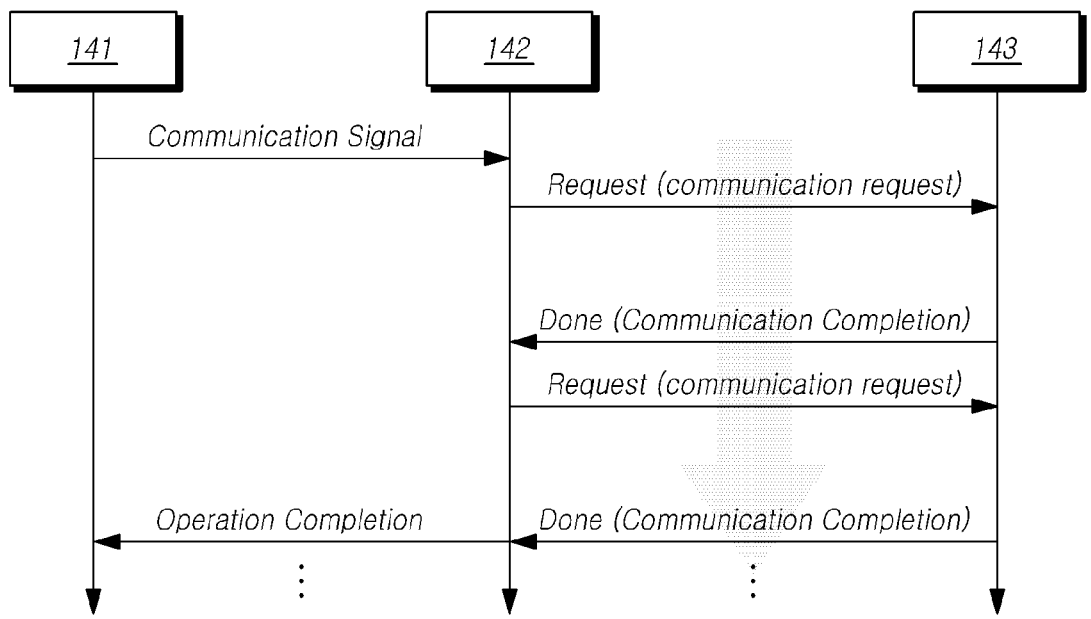
FIG. 7B is a diagram comparing and explaining a case where a timing controller in accordance with an aspect of the present disclosure performs the same operation using a dedicated processor.

FIG. 7A is a diagram comparing and explaining a case where a general processor included in a conventional timing controller operates in a polling scheme, and FIG. 7B is a diagram comparing and explaining a case where a timing controller in accordance with an aspect of the present disclosure performs the same or substantially same operation using a dedicated processor.

Figure 8:
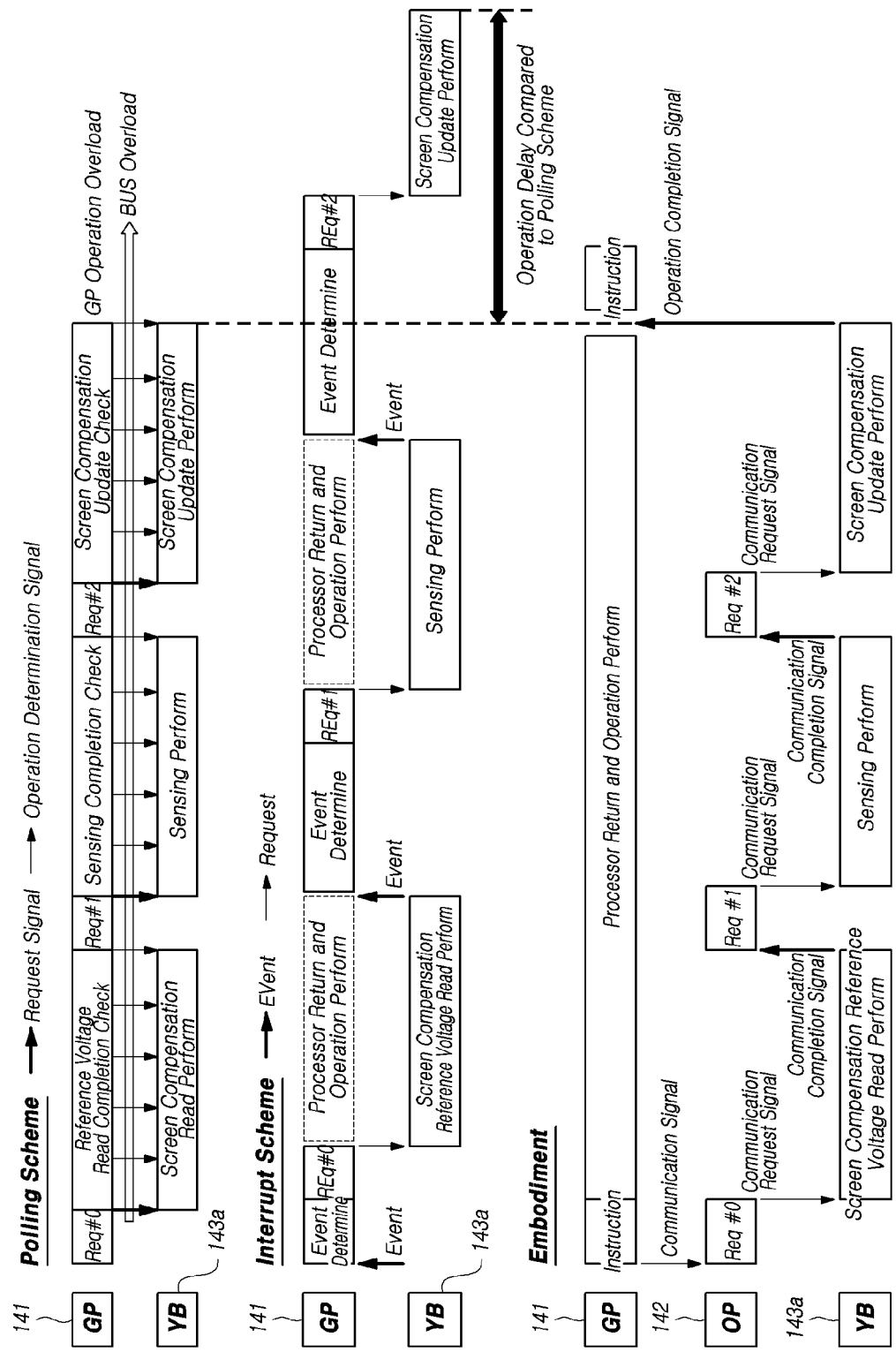
FIG. 8 shows a case in which a general timing controller including only a general-purpose processor operates in a polling scheme and a case in which it operates in an interrupt scheme, and shows the operation time of a timing controller including a dedicated processor as well as a general-purpose processor.

FIG. 8 shows a case in which a general timing controller including only a general-purpose processor operates in a polling scheme and a case in which it operates in an interrupt scheme, and shows the operation time of a timing controller including a dedicated processor as well as a general-purpose processor.

Referring to FIGS. 7A-B and FIG. 8, the timing controller 140 used in the display device 100 requires sequential scheduling due to issues such as conflict between algorithms and impossibleness of simultaneous access to a memory. For example, when the dedicated controller 143 is the screen compensation-dedicated controller 143a which performs screen compensation of the display panel 110, the dedicated controller 143a performs, as a sequential scheduling process of performing a screen compensation update, 1) screen compensation reference voltage read (YB Ref Read), 2) sensing and 3) screen compensation value update (YB Update), and the order of the operations cannot be changed.

Referring to FIG. 7A and FIG. 8, when the general processor 141 included in a conventional timing controller including only the general processor 141 operates in the polling scheme, after transmitting a communication request signal to the dedicated controller 143, the general processor 141 periodically/infinitely accesses the dedicated controller 143 and continuously transmits an operation completion check signal Done Check for checking the state of the dedicated controller 143. Accordingly, since the general processor 141 should continuously transmit the operation completion check signal Done Check, overload of the general processor 141 and a system bus is caused. Therefore, due to such overload, there may be a limit in adding algorithm calculations.

On the other hand, referring to FIG. 7B and FIG. 8, after transmitting a communication signal to the dedicated processor 142, the general processor 141 does not need to periodically access the dedicated processor 142 until an operation completion signal is received from the dedicated processor 142. Since the general processor 141 does not need to periodically transmit the operation completion check signal Done Check, overload of the general processor 141 and the system bus may be reduced.

Referring to FIG. 8, when operating in the interrupt scheme, the general processor 141 included in a conventional timing controller transfers an event signal or an interrupt, and the general processor 141 determines the event signal and performs the corresponding interrupt. In the general processor 141, a delay in operating time occurs due to the determination of the interrupt. In particular, in the event determination operation, as an event has a lower priority, an operating time according to the determination of the interrupt becomes longer, and thus, a longer delay in operating time cannot help but occur.

Because the dedicated processor 142 included in the timing controller 140 according to the aspects of the present disclosure does not perform determination on a communication completion signal corresponding to an interrupt, a corresponding operation may be completed during the same or substantially same operating time as that in the case of the operation in the polling scheme of FIG. 8.

In the above example, because it is possible to perform scheduling without a sequential event determination process in the sequential scheduling process of performing screen compensation update, the dedicated controller 143a may maintain a holding state until a new communication-dedicated instruction is inputted.

FIG. 9 is an example of a data structure diagram of a communication instruction, and FIG. 10 is an example of a data structure diagram of a communication-dedicated instruction.

Referring to FIGS. 9 and 10, a communication-dedicated instruction may have a smaller number of bits than a communication instruction. For example, the communication instruction may be composed of 32 bits like a general MIPS instruction, but the communication-dedicated instruction may be composed of 16 bits.

In the communication instruction illustrated in FIG. 9, OP indicates an instruction execution type, Rs indicates a first source register, Rt indicates a second source register, Rd indicates a destination register, Shamt indicates a shift, Funct indicates a calculation type, and Immediate indicates a specific constant and address value.

In other words, a commercial MIPS used as a communication instruction has a complex instruction structure as 32 bits, and a scheme in which generated data is stored in the data memory 141e and is fetched again from the data memory 141e is used, by which a delay cannot help but occurring. In addition, as will be described later with reference to FIG. 13, in the same manner as general computer hardware, the general processor 141 has a five stem structure and requires minimum five clocks to process a single instruction.

On the other hand, as shown in Table 1, the communication-dedicated instruction illustrated in FIG. 10 includes an instruction structure including a type field Type indicating an instruction type, an IP number field IP No. indicating a bus address and an offset field OFFSET indicating an offset value or an instruction structure including a type field Type indicating an instruction type and a constant field Constant designating a constant value.

The second instruction decoder 142c may analyze an instruction type of the type field of a communication-dedicated instruction, and thereby, may directly allocate a bus address by a bus address of the IP number field and an offset value of the offset field or may allocate a bus address by a constant value.

TABLE 1

| Type | Instruction Type |
|---|---|
| IP No. | Bus Address[15:8] = Conversion(IP No) |
| OFFSET | Bus Address[7:0] = {Offset No., 2'b0} |
| Constant | Constant Value |

Values of the 3-bit type field and their definitions are shown in Table 2. The values of the type field may be divided into BUS Write, Temp Register and Done (interrupt) Check.

TABLE 2

| Type No. | | Definition |
|---|---|---|
| 000 | BUS Write | Data = 32'h0 |
| 001 | | Data = 32'h1 |
| 010 | | Data = Register |
| 011 | | Data = 32'hFFFF_FFFF |
| 100 | Temp Register | Register = Constant |
| 101 | | Register = Cmd (From MPU) |
| 111 | Done Check | Check Intr = IP No. |

Values of 000 and 001 in the type field define 0 and 1 as data values (Request data) of a communication request signal. A value of 010 in the type field defines a value stored in a register as a data value of the communication request signal. A value of 011 in the type field defines a maximum value FFFF FFFF as a data value of the communication request signal. Values of 100 and 101 in the type field define that a constant value Constant and a value Cmd received from the general processor 141 are stored in a temporary register. The value of 010 in the type field defines a value stored in the temporary register as a data value (Request data) of the communication request signal.

A value of 111 in the type field defines checking whether an interrupt is correct or not.

Figure 11:
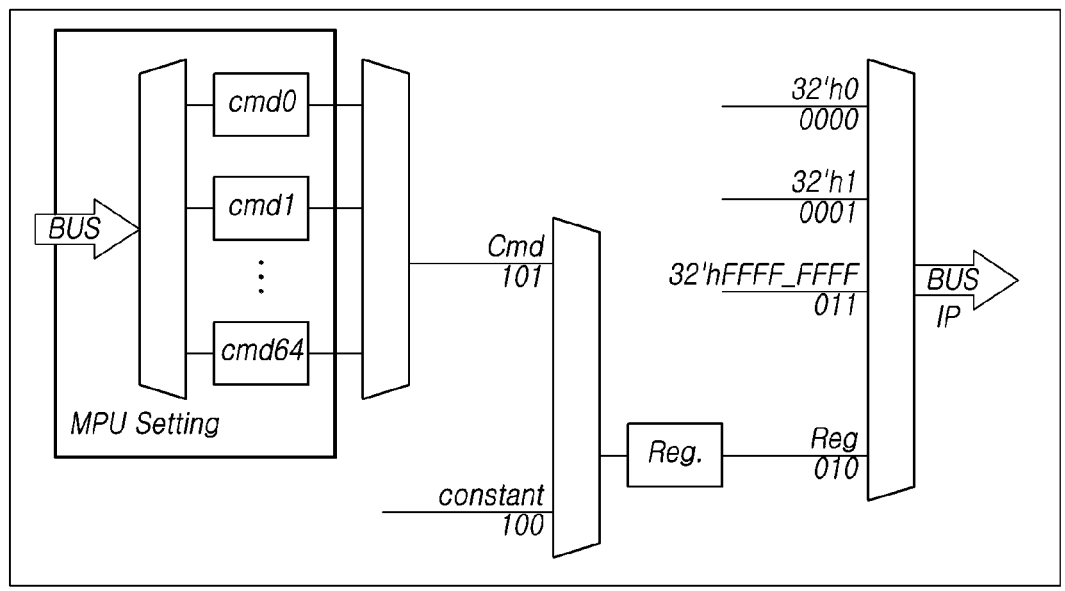
FIG. 11 is a diagram illustrating a process in which the data value of a communication request signal to be transmitted to a dedicated controller is determined depending on the value of a type field of the communication-dedicated instruction of FIG. 10.

FIG. 11 is a diagram illustrating a process in which the data value of a communication request signal to be transmitted to a dedicated controller is determined depending on the value of a type field of the communication-dedicated instruction of FIG. 10.

Referring to FIG. 11, when the value of the type field is 100, the dedicated processor 142 stores a constant value constant in a temporary register Reg., and when the value of the type field is 101, the dedicated processor 142 stores one among values Cmd 0 to Cmd 64 received from the general processor 141 in the register Reg.

When the values of the type field are 000 and 001, the dedicated processor 142 outputs 0 and 1 as data values Request data of the communication request signal. When the value of the type field is 011, the dedicated processor 142 outputs a maximum value FFFF FFFF as the data value of the communication request signal. When the value of the type field is 010, the dedicated processor 142 outputs the value stored in the temporary register as the data value Request data of the communication request signal.

When the value of the type field is 111, the dedicated processor 142 does not output a communication request signal, and checks the accuracy of an interrupt by checking the interrupt with the number of the corresponding dedicated controller 143. For example, when an interrupt is inputted from each of the dedicated controllers 143a to 143n, the dedicated processor 142 converts the interrupt into a specific interrupt value, and then, compares the specific interrupt value with the number of the corresponding dedicated controller 143 of a communication-dedicated instruction to check the accuracy of the interrupt. When the interrupt is not an accurate interrupt, the communication-dedicated instruction is held, and standby is made until a new interrupt occurs.

Figure 12:
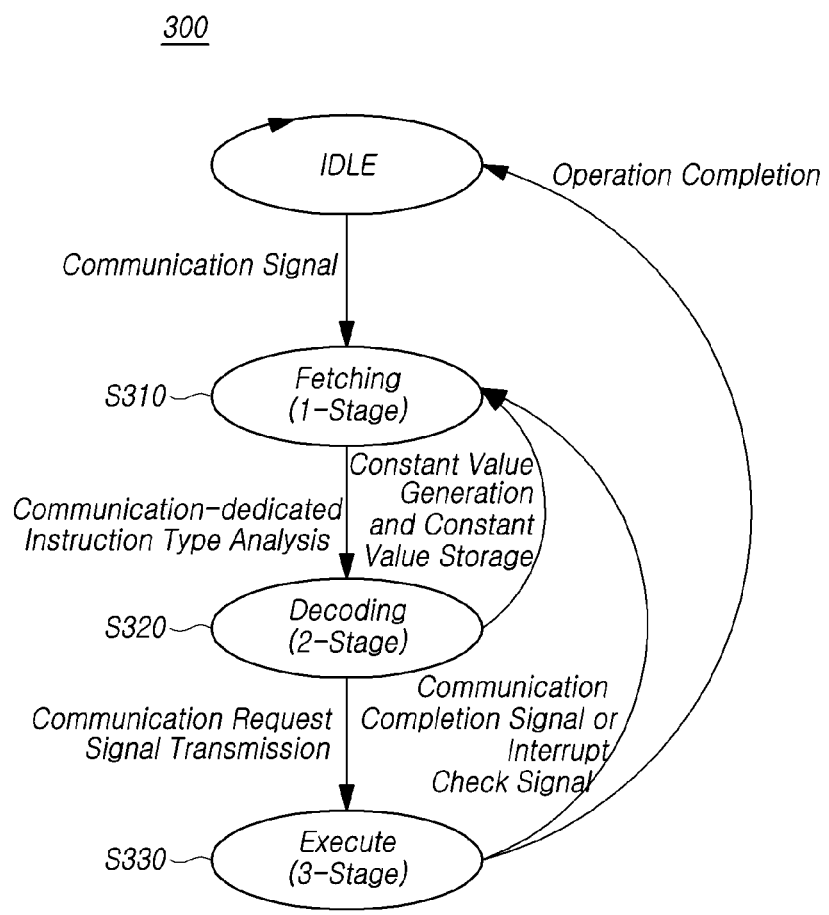
FIG. 12 is a diagram illustrating a process in which a constant value is generated and stored or a communication request signal is transmitted in two steps or three steps according to analysis of an instruction type of FIG. 11.
Figure 13:
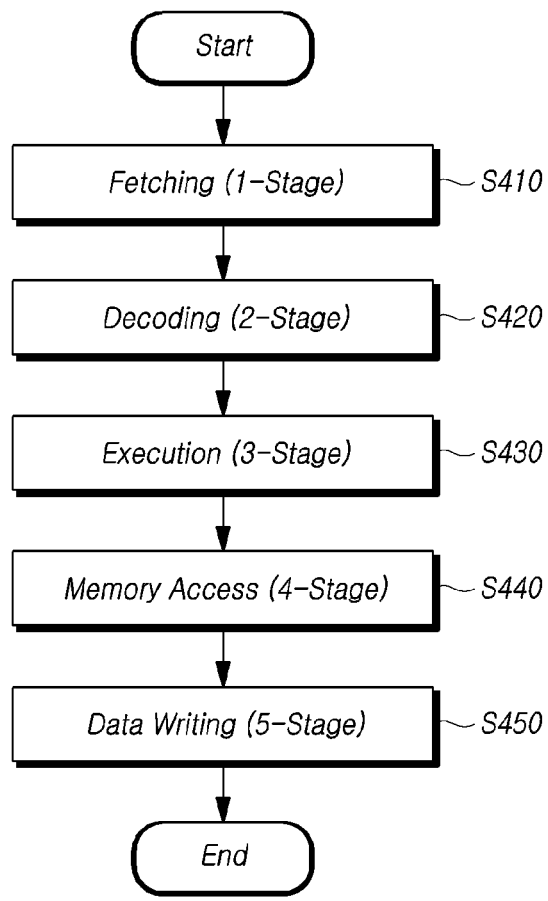
FIG. 13 is a diagram illustrating a process in which a general processor of a conventional timing controller not including a dedicated processor operates.

FIG. 12 is a diagram illustrating a process in which a constant value is generated and stored or a communication request signal is transmitted in two steps or three steps according to analysis of an instruction type of FIG. 11. FIG. 13 is a diagram illustrating a process in which a general processor of a conventional timing controller not including a dedicated processor operates.

Referring to FIGS. 5 and 12, when receiving a communication signal from the general processor 141, the dedicated processor 142 fetches communication-dedicated instructions of the data structure illustrated in FIG. 10 to the second instruction memory 142b (S310).

When the second instruction decoder 142c interprets a communication-dedicated instruction designated by the communication signal among the fetched communication-dedicated instructions, the second instruction decoder 142c analyzes the value of the instruction type field of the communication-dedicated instruction as described above with reference to FIG. 11 (S320).

When the values of the type field of the corresponding communication-dedicated instruction are 100 and 101, after performing two stems of storing a constant value constant and a value Cmd received from the general processor 141 in the temporary register, the step S310 is performed again.

When the value of the type field of the corresponding communication-dedicated command is 010 or 111, a communication request signal corresponding to the value is transmitted or a process of checking the accuracy of an interrupt is performed (S330).

In the step S330, when a communication completion signal for the communication request signal is received or an interrupt signal is received, the step S310 is performed again. When all operations of an operation area designated by the communication signal of the general processor 141 are performed, an operation completion signal is transmitted to the general processor 141, and an idle state is maintained until a next communication signal is received.

As illustrated in FIG. 13, the general processor of a conventional timing controller not including a dedicated processor operates, like conventional computer hardware, in five stems of fetching step S410, decoding step S420, execution step S430, memory access step S440 and data writing step S450. Therefore, as described above, in the same manner as conventional computer hardware, the general processor has a five step structure and requires minimum five clocks to process a single instruction.

On the other hand, as described above with reference to FIGS. 5 and 12, since the dedicated processor 142 performs only two stems or three stems according to analysis of the instruction type field, all operations may be performed using only two or three clocks.

Table 3 and Table 4 are tables that compare occupancy times and instruction sizes of general processors of the conventional timing controller and the timing controller according to the aspect by using an internal timer according to a general method in screen compensation operations OF RF, RT and OFF RS of a display device having an FHD resolution.

TABLE 3

| | Occupancy time of general processor | | |
|---|---|---|---|
| | Conventional timing controller | Timing controller according to aspect | Reduction amount |
| ON RF | 2.09 s | 0.07 s | 96.7% ▼ |
| RT | 29 us | 0.27 us | 99% ▼ |
| OFF RS | 166 s | 34 s | 80% ▼ |
| Total | About 168 s | about 34 s | About 80% ▼ |

TABLE 4

| | Instruction size | | | |
|---|---|---|---|---|
| | Conventional timing controller | Timing controller according to aspect | | |
| | | General Processor | Dedicated Processor | Reduction amount |
| ON RF | 1,804 B | 704 B | 438 B | 37% ▼ |
| RT | 6,188 B | 3,668 B | 48 B | 40% ▼ |
| OFF RS | 2,116 B | 1,432 B | 712 B | — |
| Total | 10,108 B | 5,916 B | 1,198 B | 30% ▼ |

As may be seen from Table 3 and Table 4, the timing controller 140 according to the aspect could reduce the amount of use of the general processor 141 by at least 80% and an instruction size by at least 30%.

The above-described timing controller 140 according to the aspects of the present disclosure may be used in the display device 100 described above with reference to FIG. 1. As described above with reference to FIG. 1, the display device 100 includes the display panel 110 including two or more pixels which are disposed at intersections of data lines and gate lines, the driving driver 120 and 130 which drives the data lines and the gate lines, and the timing controller 140 described above with reference to FIGS. 2 to 10 which provides image data and control signals to the driving driver 120 and 130.

Accordingly, the timing controller 140 and the display device 100 including the same according to the aspects of the present disclosure described above may reduce overload of a general processor and a system bus, and may not cause a delay in operating time since event determination is not performed or a small-sized instruction is used.

Although the timing controller 140 and the display device 100 including the same according to the aspects of the present disclosure have been described with reference to the drawings, it is to be noted that the present disclosure is not limited thereto. For example, although it has been described that, unlike the above-described general processor 141, the dedicated processor 142 includes only components necessary to store and interpret a communication-dedicated instruction necessary for communication with the dedicated controller 143, the dedicated processor 142 may be the same or substantially same as the general processor 141 in terms of hardware, but may deactivate some components or resources in a hardware scheme or by software.

Features, structures and effects and the like described in association with the aspects above are incorporated into at least one aspect of the present disclosure, but are not limited to only one aspect. Furthermore, features, structures and effects and the like exemplified in association with respective aspects may be implemented in other aspects by combination or modification by those skilled in the art. Therefore, contents related to such combinations and modifications should be construed as falling within the scope of the present disclosure.

In the above description, the present disclosure has been described based on the exemplary aspects, but the exemplary aspects are for illustrative, and do not limit the present disclosure, and those skilled in the art will appreciate that various modifications and applications, which are not exemplified in the above description, may be made without departing from the scope of the essential characteristic of the present exemplary aspects. For example, each component described in detail in the aspects may be modified.

It will be apparent to those skilled in the art that various modifications and variations can be made in the timing controller and the display device including the same of the present disclosure without departing from the spirit or scope of the aspects of the present disclosure. Thus, it is intended that the present disclosure covers the modifications and variations of the aspects provided they come within the scope of the appended claims and their equivalents.

What is claimed is:

1. A timing controller for providing image data and control signals to a driving driver of a display device, comprising:
    at least one dedicated controller configured to instruct the driving driver to perform a specific operation; and
    a dedicated processor configured to store at least one communication-dedicated instruction, interpret, according to a communication signal selecting a communication-dedicated instruction received from an external or internal general processor, the selected communication-dedicated instruction, sequentially transmit communication request signals to the corresponding dedicated controller, sequentially receive communication completion signals from the dedicated controller, and transmit an operation completion signal to the general processor when a communication completion signal for the selected communication-dedicated instruction is finally received.

2. The timing controller of claim 1, wherein the communication signal selects the communication-dedicated instruction by designating an operation area of the communication-dedicated instruction.

3. The timing controller of claim 1, wherein the communication request signals transmitted to the corresponding dedicated controller are determined based on the interpretation of the selected communication-dedicated instruction.

4. The timing controller of claim 1, wherein the general processor comprises:
    a first program counter;
    a first instruction memory which stores an instruction including a communication instruction;
    a first instruction decoder which interprets the instruction designated by the first program counter;
    a first executer which performs a calculation or generates the communication signal according to a result interpreted by the first instruction decoder; and
    a first data memory which stores a calculation result,
    wherein, when the first program counter designates the communication instruction, the first instruction decoder interprets the communication instruction, and the first executer generates a communication signal which selects a communication-dedicated instruction from the at least one communication-dedicated instruction, according to the interpreted communication instruction.

5. The timing controller of claim 2, wherein after transmitting the communication signal to the dedicated processor, the general processor designates a next instruction by increasing a value of the first program counter, and performs another operation according to the next instruction.

6. The timing controller of claim 2, wherein the dedicated processor comprises:
a second program counter;
a second instruction memory which stores at least one communication-dedicated instruction, a second instruction decoder which interprets the communication-dedicated instruction designated by the second program counter; and
a second executer which sequentially transmits communication request signals to the corresponding dedicated controller by interpreting the selected communication-dedicated instruction according to a result interpreted by the second instruction decoder, sequentially receives communication completion signals from the dedicated controller and transmits an operation completion signal to the general processor when a communication completion signal for the selected communication-dedicated instruction is finally received.

7. The timing controller of claim 3, wherein the general processor fetches the communication instruction from an external or internal nonvolatile memory, and stores the communication instruction in the first instruction memory, and
wherein the dedicated processor fetches the communication-dedicated instruction from the nonvolatile memory, and stores the communication-dedicated instruction in the second instruction memory.

8. The timing controller of claim 1, wherein, when sequentially receiving communication completion signals from the dedicated controller, the dedicated processor transmits a communication request signal corresponding to a next communication-dedicated instruction to the dedicated controller without performing determination on the communication completion signals.

9. The timing controller of claim 4, wherein the communication-dedicated instruction has a smaller number of bits than the communication instruction.

10. The timing controller of claim 6, wherein the communication-dedicated instruction includes:
an instruction structure including a type field that indicates an instruction type;
an IP number field that indicates a bus address and an offset field that indicates an offset value or an instruction structure including a type field that indicates an instruction type;
a constant field that designates a constant value,
wherein the second instruction decoder analyzes an instruction type of the type field of the communication-dedicated instruction, and directly allocates a bus address by a bus address of the IP number field and an offset value of the offset field or allocates a bus address by a constant value.

11. The timing controller of claim 7, wherein a data value of the communication request signals transmitted to the corresponding dedicated controller is determined depending on a value of the type field of the communication-dedicated instruction.

12. A display device comprising:
a display panel including two or more pixels which are disposed at intersections of data lines and gate lines;
a driving driver configured to drive the data lines and the gate lines; and
the timing controller of claim 1.

* * * * *